United States Patent
Plank et al.

(10) Patent No.: US 9,906,717 B1
(45) Date of Patent: Feb. 27, 2018

(54) METHOD FOR GENERATING A HIGH-RESOLUTION DEPTH IMAGE AND AN APPARATUS FOR GENERATING A HIGH-RESOLUTION DEPTH IMAGE

(71) Applicant: Infineon Technologies AG, Neubiberg (DE)

(72) Inventors: Hannes Plank, Dobl (AT); Norbert Druml, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/254,306

(22) Filed: Sep. 1, 2016

(51) Int. Cl.
*H04N 5/232* (2006.01)
*G06T 7/00* (2017.01)
*G06T 3/40* (2006.01)

(52) U.S. Cl.
CPC .......... *H04N 5/23232* (2013.01); *G06T 3/40* (2013.01); *G06T 7/0085* (2013.01)

(58) Field of Classification Search
CPC . H04N 5/23232; G06T 15/005; G06T 15/405; G06T 3/40; G06T 3/4053; G06T 7/0085; G06T 7/593; G06T 7/0051; G06T 2207/10012; G06T 2207/10028; G06T 2207/10024; G06T 5/10; G06T 5/001; G06T 5/20; G06T 19/006; G06T 11/001; G06T 2215/16; G06T 2200/28; G01B 11/026; G01B 11/24; G01S 7/48; G01S 7/4808; G01S 7/4915; G01S 7/4911; G01S 7/4865; G01S 7/4918; G01S 17/89; G01S 17/08

USPC ....................................................... 348/222.1
See application file for complete search history.

(56) References Cited

U.S. PATENT DOCUMENTS

| | | | |
|---|---|---|---|
| 8,355,565 B1 * | 1/2013 | Yang | G06T 7/593 |
| | | | 382/154 |
| 9,134,114 B2 | 9/2015 | Metz et al. | |
| 9,262,806 B2 * | 2/2016 | Gevrekci | G06T 3/4076 |
| 9,760,837 B1 * | 9/2017 | Nowozin | G06N 99/005 |
| 9,767,596 B2 * | 9/2017 | Jung | G06T 15/005 |
| 9,784,822 B2 * | 10/2017 | Metz | G01S 7/4865 |
| 9,786,252 B2 * | 10/2017 | Shin | G09G 5/10 |
| 2012/0038751 A1 * | 2/2012 | Yuan | H04N 5/23232 |
| | | | 348/51 |
| 2014/0119603 A1 * | 5/2014 | Jin | G06T 7/254 |
| | | | 382/103 |

(Continued)

OTHER PUBLICATIONS

Nair, Rahul et al. "A Survey on Time-of-Flight Stereo Fusion," Sep. 11, 2013, pp. 1-21.

(Continued)

*Primary Examiner* — Pritham Prabhakher
(74) *Attorney, Agent, or Firm* — Eschweiler & Potashnik, LLC

(57) ABSTRACT

A method for generating a high-resolution depth image includes providing at least a first low-resolution raw image. Furthermore, the method includes providing at least one high-resolution raw image. A resolution of the high-resolution raw image is higher than a resolution of the first low-resolution raw image. Furthermore, the method includes generating a low-resolution depth image. Furthermore, the method includes generating the high-resolution depth image based on the low-resolution depth image and the high-resolution raw image.

20 Claims, 4 Drawing Sheets

(56) References Cited

U.S. PATENT DOCUMENTS

| | | | |
|---|---|---|---|
| 2014/0193041 A1* | 7/2014 | Gevrekci | G06T 3/4076 |
| | | | 382/107 |
| 2015/0015569 A1* | 1/2015 | Jung | G06T 15/005 |
| | | | 345/419 |
| 2015/0071526 A1* | 3/2015 | Nguyen | G06T 5/10 |
| | | | 382/154 |
| 2015/0206318 A1* | 7/2015 | Parfenov | G06T 5/003 |
| | | | 382/154 |
| 2015/0310669 A1* | 10/2015 | Kamat | G06T 19/006 |
| | | | 345/633 |
| 2016/0003937 A1* | 1/2016 | Metz | G01S 17/89 |
| | | | 356/5.01 |
| 2016/0063715 A1* | 3/2016 | Wan | G06T 3/40 |
| | | | 382/195 |
| 2016/0231866 A1* | 8/2016 | Tretter | G06F 3/14 |

OTHER PUBLICATIONS

Ferstl, David et al. "Variational Depth Superresolution using Example-Based Edge Representations," Graz University of Technology Institute for Computer Graphics and Vision, Graz, Austria. 9 pages.

Langmann, Benjamin et al. "Comparison of Depth Super-Resolution Methods for 2D/3D Images," International Journal of Computer Information Systems and Industrial Management Applications, ISSN 2150-7988 vol. 3 (2011) pp. 635-645.

\* cited by examiner

METHOD FOR GENERATING A HIGH-RESOLUTION DEPTH IMAGE AND AN APPARATUS FOR GENERATING A HIGH-RESOLUTION DEPTH IMAGE

FIELD

Embodiments relate to concepts for producing images, and in particular to a method for generating a high-resolution depth image and an apparatus for generating a high-resolution depth-image.

BACKGROUND

Depth sensing cameras based on time-of-flight technology work by measuring a runtime of emitted light between a camera and the scene. In order to receive a valid measurement a certain amount of light needs to be reflected and arrive at a sensor (e.g., the camera) of the depth sensing systems. The sensor usually comprises a plurality of pixels to sense the reflected light and to produce a depth image of the scene. Pixels with insufficient signal strength may be noisy and/or invalid, which may limit the range and/or the resolution of the camera. A longer exposure time of the sensor may lead to more accurate measurements. However, a long exposure time is often not feasible due to eye safety reasons of a person exposed to the emitted light, power consumption and thermal stress of the device itself. A long exposure time may also limit a frame rate of the depth sensing system.

Furthermore, depth sensing systems may suffer from motion artifacts. In order to calculate depth images from raw data with Signal to Noise Ratio four or more sequential sub-images are often recorded. Camera motion and/or a motion of an object in the scene may cause these sub-images to be inconsistent, which may result in invalid depth data, called motion artifacts and, in turn, hinder the use of multiple images for the generation of a single depth image.

There is a desire to improve the generation of depth images of depth sensing systems.

SUMMARY

Some embodiments relate to a method for generating a high-resolution depth image. The method comprises providing at least a first low-resolution raw image. Furthermore, the method comprises providing at least one high-resolution raw image. A resolution of the high-resolution raw image is higher than a resolution of the first low-resolution raw image. Furthermore, the method comprises generating a low-resolution depth image. Furthermore, the method comprises generating the high-resolution depth image based on the low-resolution depth image and the high-resolution raw image.

Some embodiments relate to an apparatus for generating a high-resolution depth image. The apparatus comprises an input interface configured for receiving at least a first low-resolution raw image and for receiving at least one high-resolution raw image. A resolution of the first low-resolution raw image is lower than a resolution of the high-resolution raw image. Furthermore, the apparatus comprises an image processing module configured for generating a low-resolution depth image and configured for generating a high-resolution depth image based on the low-resolution depth image and based on the high-resolution raw image. Furthermore, the apparatus comprises an output interface configured for providing the generated high-resolution depth image.

Some embodiments relate to a depth sensing system for generating a high-resolution depth image. The depth sensing system comprises a time-of-flight sensor configured for capturing at least a first low-resolution raw image and configured for capturing at least one high-resolution raw image. A resolution of the first low-resolution raw image is lower than a resolution of the high-resolution raw image. Furthermore, the depth sensing system comprises an apparatus for generating the high-resolution depth image.

BRIEF DESCRIPTION OF THE DRAWINGS

Some embodiments of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1A:
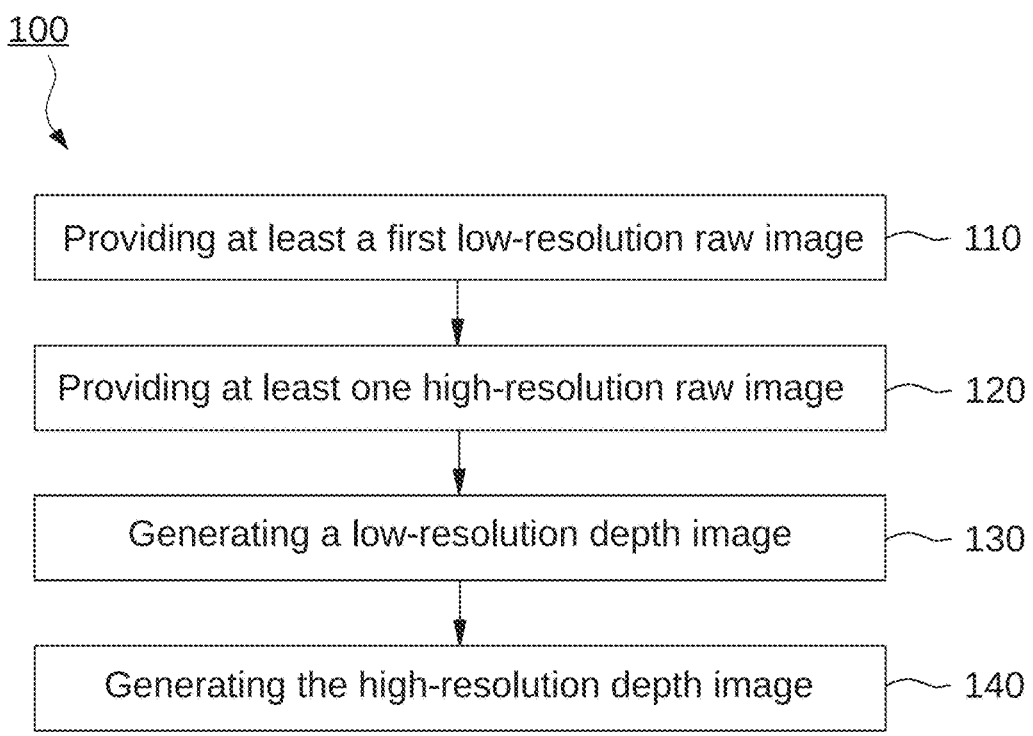
FIG. 1A shows a flow chart of a method for generating a high-resolution depth image.

FIG. 1A shows a flow chart of a method 100 for generating a high-resolution depth image. The method 100 comprises providing 110 at least a first low-resolution raw image. Furthermore, the method 100 comprises providing 120 at least one high-resolution raw image. A resolution of the high-resolution raw image is higher than a resolution of the first low-resolution raw image. Furthermore, the method 100 comprises generating 130 a low-resolution depth image. Furthermore, the method 100 comprises generating 140 the high-resolution depth image based on the low-resolution depth image and the high-resolution raw image.

By generating a high-resolution depth image based on a low-resolution depth image and a high-resolution raw image, the method 100 may operate on a reduced amount of raw data. This may create new opportunities for operating depth sensing systems to generate improved depth images. Without sacrificing resolution, high-resolution depth images may be improved in terms of noise and/or motion artifacts by employing the method 100, for example. The method 100 may also allow lower power consumption and/or lower hardware complexity of depth sensing systems.

For example, a low-resolution raw image may comprise a higher signal-to-noise ratio than a high-resolution raw image because a ratio of captured light per raw pixel may be higher in the low-resolution raw image than in the high-resolution raw image. Incorporating at least one raw image with a higher signal-to-noise ratio (e.g., at least the first low-resolution raw image) into the generation of a high-resolution depth image may provide a higher signal-to-noise ratio of the generated high-resolution depth image. A depth sensing system employing the method 100 may thus comprise a higher sensitivity. A higher sensitivity may enhance a range of the depth sensing system and/or make depth measurements more accurate.

Because the low-resolution raw image may comprise a higher signal-to-noise ratio than a high-resolution raw image, an illumination time required by a depth sensing system for capturing the low-resolution raw image may be reduced which may reduce power consumption of the depth sensing system. A reduced illumination time and intensity may also provide higher eye safety of the depth sensing system.

To generate the high-resolution depth image, the at least required first low-resolution raw image and the at least one high-resolution raw image may be captured by the same time-of-flight sensor (e.g., camera) of a depth sensing system. This may reduce hardware complexity of the depth sensing system.

Since the method 100 may only require less high-resolution raw images (e.g., one high-resolution raw image) to generate the high-resolution depth image, the amount of data to be provided by a time-of-flight sensor of a depth sensing system may be reduced. Because a smaller amount of data may be transferred from the time-of-flight sensor (e.g., when providing the first low-resolution raw image) to an image processing module and/or to a memory device, the time-of-flight sensor may be sooner ready again to capture another raw image (e.g., the at least one high-resolution raw image) due to a reduced transfer time of the preceding image. Thus, a delay between capturing raw images (e.g., a delay between capturing the at least first low-resolution raw image and capturing the at least one high-resolution raw image) required for the generation of the high-resolution depth image may be reduced. This may mitigate motion artifacts in the generated high-resolution depth image. Moreover, if the method 100 is used for generating a series of high-resolution depth images, a shorter delay between capturing raw images may provide a higher frame rate (e.g., a higher rate of generated high-resolution depth images). For example, this may be used in gesture sensing systems and may make recognition of gestures more reliable. For example, the faster the capturing process, the less motion artifacts may occur and a camera (e.g., the time-of-flight sensor) of a depth sensing system may be used to sense faster movements.

A depth image (e.g., the low-resolution depth image and/or the high-resolution depth image) may be a two-dimensional array of depth pixels. Each depth pixel of the depth image may include depth (e.g. distance, e.g. three-dimensional 3D) information related to an object captured in the depth image. For example, depth information may be related to the distance of a surface of the object to a reference plane or reference point, for example. Depth information of each depth pixel may be represented by a depth value comprised by each depth pixel. The depth value of each depth pixel may comprise a numerical value (e.g., a floating point number) corresponding to the distance of the surface of the object from the reference plane (or reference point). The reference plane (or reference point) may be a plane of (or a point on, respectively) an array of light sensitive elements (e.g., pixel sensors or sensels) of a time-of-flight sensor, for example.

A light sensitive element of a time-of-flight sensor may comprise a photo diode and a charge repository (e.g., a capacitor) used for storing charges generated by the photo diode upon reception of light (e.g., a reflection of a light pulse emitted by an illumination module of a depth sensing system). An illumination module of a depth sensing system may comprise various kinds of light emitters, such as light emitting diode, lasers, and/or other precision light sources. The illumination module may be configured for emitting light pulses of a certain wavelength and/or of a certain wavelength spectrum (e.g., infrared light). A time-of-flight sensor may further comprise an optical filter to be sensitive towards light generated by the illumination module an insensitive towards light of different wavelengths. Additionally, an illumination signal (e.g., light pulses) generated by the illumination module may be used to demodulate incoming light at a light sensitive element (e.g., a time-of-flight pixel) into a raw image, which is proportional to the phase-shift between the illumination signal and incoming pulsed light.

A raw image (e.g., the at least first low-resolution raw image and/or the at least one high-resolution raw image) may be a two-dimensional array of raw pixels. Each raw pixel of the raw image may include at least one raw pixel value. A raw pixel value may be a digital equivalent of electric charges accumulated at at least one light sensitive element of the time-of-flight sensor corresponding to the raw pixel.

For example, in some time-of-flight sensors a raw pixel value may correspond to an intensity value (e.g., to information about how much light has been collected by a corresponding light sensitive element of the time-of-flight sensor of a depth sensing system during an active time interval of the time-of-flight sensor for capturing the raw image). Moreover, raw images provided by such kind of time-of-flight sensors may comprise information (e.g., meta information) about a time shift (and/or a phase shift) of an active time interval of the time-of-flight sensor for capturing the raw image relative to the start of a light pulse emitted by an illumination module of the depth sensing system, for example. For example, the start of the light pulse may be the moment in time, when the intensity of the light pulse has increased to 10% of the maximum intensity of the light pulse.

In alternative time-of-flight sensors a raw pixel value of a raw pixel may correspond to an intensity difference value between intensity values of at least a first and a second charge repository (e.g., a first and a second bucket). The first and the second charge repository may be comprised by a light sensitive element of the time-of-flight sensor corresponding to the raw pixel (e.g., each light sensitive element of the time-of-flight sensor may comprise a first and a second charge repository). During operating such a time-of-flight sensor of a depth sensing system, an illumination module of the depth sensing system may emit an illumination signal consisting of a series of light pulses with pause intervals between adjacent light pulses. The light pulses may be reflected at an object and may be received by the light sensitive element(s) of the time-of-flight sensor. Upon reception electric charge may be accumulated partially in the first charge repository and partially in the second charge repository of the light sensitive element depending on which charge repository may be momentarily active. For example, the illumination signal may be used to switch between accumulating electric charge in the first or in the second charge repository. An active time interval of the time-of-flight sensor may correspond to an active time interval of a charge repository for accumulating electric charge.

For example, an active time interval (e.g., the start of the active time interval) for accumulating electric charge in the first charge repository may coincide with the start of a light pulse emitted from the illumination module or may have a set time shift (or set phase shift) with respect to the start of the emitted light pulse. The length of the active time interval of the first charge repository may be essentially equal to the length of a light pulse. The length of a light pulse may be the length of a time interval during which the intensity of the light pulse is larger than 10% of the maximum intensity of the light pulse.

Directly following the accumulation of electric charge in the first charge repository, electric charge may be accumulated in the second charge repository during an active time interval of the second charge repository, for example. For example, the active time interval (e.g., the start of the active time interval) of the second charge repository may coincide with the start of a pause interval between two light pulses emitted by the illumination module and may thus have a time shift (or phase shift) amounting to the length of a light pulse relative to the start of an emitted light pulse. If the active time interval of the first charge repository comprises already a time shift (or a phase shift) with respect to the start of an emitted light pulse, the active time interval of the second charge repository may be shifted in time (or phase) by the same amount of this time shift (or phase shift, respectively) from the start of the pause interval. The start of the pause interval may be the moment in time, when the intensity of the light pulse has decreased to 10% of the maximum intensity of the light pulse. The length of the active time interval of the second charge repository may be essentially equal to the length of the active time interval of the first charge repository and/or to the length of the pause interval.

The coincidence (e.g., a time shift or phase shift of essentially zero) and/or the set time shifts (or phase shifts) of the active time intervals of the first charge repository and/or the second charge repository with respect to the start of a light pulse may be characteristic for the raw image captured by the time-of-flight sensor. For example, the time shifts (or phase shifts) set for capturing (e.g., providing) the at least first low-resolution raw image and the at least one high-resolution raw image may be different.

Additionally, directly after having accumulated electric charge in the second charge repository, the first charge repository may be set active again by the illumination signal to accumulate electric charge during another active time interval of the first charge repository in course of the reception of a reflection of another light pulse of the emitted series of light pulses. Directly afterwards the second charge repository may be set active again and so on. In this manner, electric charge may be accumulated in the first and in the second charge repository in course of the reception of a reflection of a plurality of light pulses of the emitted series of light pulses. The amount of electric charge accumulated in each charge repository may depend on the amount of light of the reflected light pulses collected by the light sensitive element and/or on the time shift (or phase shift) between the active time intervals of the first and/or the second charge repository with respect to the start of an emitted light pulse.

The electric charges accumulated in the first and the second charge repository may correspond to an intensity value (e.g., a voltage). Each charge repository may be connected to a dedicated analog-to-digital converter. The analog-to-digital converters may read the intensity values from the charge repositories and provide the digitized intensity values to a digital arithmetic circuit. The digital arithmetic circuit may be configured to calculate a difference between the two intensity values. The calculated intensity difference value may then correspond to (e.g., be equal to) the raw pixel value of the raw pixel corresponding to the light sensitive element. Due to calculating the difference between the two intensity values, effects of ambient light received by the light sensitive element on the raw pixel value may be reduced and/or cancelled.

Additionally, raw images may be preprocessed by at least one (or several) image processing operations and/or calibration operations.

Additionally or alternatively to providing at least a first low-resolution raw image and to generating the low-resolution depth image using the low-resolution raw image, a low-resolution depth image may be provided from an alternative source. Moreover, instead of using a high-resolution raw image also a further high-resolution depth image may be used to determine the high-resolution depth image. The method 100 may then provide for generating a high-resolution depth image that may comprise more accurate depth information than the initially provided high-resolution depth image.

The resolution (or pixel resolution) may refer to the number of pixels (e.g., depth pixels or raw pixels) of a two-dimensional array of a depth image and/or of a raw image. For example, the at least one high-resolution raw image has a higher resolution (e.g., a higher number of pixels) than the at least first low-resolution raw image. The resolution of the at least first low-resolution raw image may be the same as (or higher than) the resolution of the low-resolution depth image. The resolution of the at least one high-resolution raw image may be the same as (or higher than) the resolution of the high-resolution depth image. The high-resolution depth image has a higher resolution than the low-resolution depth image, for example.

The method 100 comprises providing 110 at least a first low-resolution raw image (e.g., at least one low-resolution raw image). However, further embodiments may also comprise providing more than one low-resolution raw image. Further embodiments may also comprise providing more than one high-resolution raw image. The sequence of providing 110 the at least first low-resolution raw image and providing 120 the at least one high-resolution raw image may be arbitrary. For example, the at least first low-resolution raw image may be provided before providing 120 the at least one high-resolution raw image, but may also be provided after providing 120 the high-resolution raw image. If more than one low-resolution raw image is provided, some (e.g., one or more) low-resolution raw images may be provided before providing the high-resolution raw image and some (e.g., one or more) low-resolution raw images may be provided after providing the high-resolution raw image, for example. If a plurality of low-resolution raw images and a plurality of high-resolution raw images are provided, the low-resolution raw images and high-resolution raw images may be provided in any ordering. According to an example, first three low-resolution raw images are provided and then a high-resolution raw image is provided. According to another example, first seven low-resolution raw images are provided and afterwards a high-resolution raw image is provided.

Generating the low-resolution depth image may be based on raw pixel values of raw pixels of the at least first low-resolution raw image and may be additionally based on raw pixel values of raw pixels of the at least one high-resolution raw image. The raw pixel values may be used together with information about time shifts or phase shifts (between an active time interval for capturing each raw image relative to the start of an emitted light pulse) to calculate a depth value of each depth pixel of the low-resolution depth image.

The generation of the low-resolution depth image may be based on a plurality of low-resolution raw images and on one high-resolution raw image and optionally on additional high-resolution raw images. A plurality of low-resolution raw images and/or optionally one or more additional high-resolution raw images may further enhance the depth accuracy of the low-resolution depth image and thus also the depth accuracy of the high-resolution depth image.

According to an example, generating 130 the low-resolution depth image is based on the first low-resolution raw image. For example, each raw pixel of the first low-resolution raw image may comprise two (or more) raw pixel values (e.g., a first raw pixel value and a second raw pixel value). The at least two raw pixel values may be based on separate measurements of a time-of-flight sensor. The two measurements may comprise different time shifts between an active time interval of the time-of-flight sensor relative to the start of an emitted light pulse used for the measurements. From the two raw pixel values and from the information about the time shifts for each measurement, depth information from each raw pixel of the first low-resolution raw image may be extracted (e.g., calculated). This calculation may comprise evaluating a quotient based on the two raw pixel values and determining a phase shift of a reflected light pulse received by the time-of-flight sensor relative to the emitted light pulse. The calculation may further comprise calculating a distance (e.g., a depth value) from the time-of-flight sensor to an object in the first low-resolution raw image based on at least the determined phase shift. The depth information corresponding to each raw pixel of the low-resolution raw image may then be mapped (e.g., provided) to a corresponding depth pixel in the low-resolution depth image to generate 130 the low-resolution depth image. A corresponding depth pixel in the low-resolution depth image may for example comprise an x-coordinate and a y-coordinate corresponding to (e.g., being proportional to or being the same as) an x-coordinate and a y-coordinate of the related raw pixel in the low-resolution raw image.

For example, generating the low-resolution depth image may be based on a plurality of low-resolution raw images (e.g., at least a first low-resolution raw image and a second low-resolution raw image). Each raw pixel of each low-resolution raw image may comprise only one raw pixel value (but may also comprise two or more raw pixel values). For example, the different low-resolution raw images of the plurality of low-resolution raw images may be based on separate measurements of a time-of-flight sensor with differing time shifts between active time intervals of the time-of-flight sensor (e.g., of charge repositories) relative to the starts of emitted light pulses used during the measurements. The low-resolution raw images may comprise the same resolution or may comprise different resolutions. To generate 130 the low-resolution depth image, depth information may be extracted (e.g., calculated) from raw pixel values of corresponding raw pixels of the low-resolution raw images and be provided to a corresponding depth pixel of the low-resolution depth image until all depth pixels of the low-resolution depth image have been provided with depth information. By generating 130 the low-resolution depth image based on a plurality of low-resolution raw images accuracy of the depth information of the low-resolution depth image may be enhanced, for example.

According to an example, generating 130 the low-resolution depth image may be based on the at least first low-resolution raw image and on the at least one high-resolution raw image. Generating 130 the low-resolution depth image based on the at least first low-resolution raw image and on the at least one high-resolution raw image may enable providing fewer additional low-resolution raw images and/or generating 130 a low-resolution depth image with high depth information accuracy. For example, it may be sufficient to provide only the first low-resolution raw image and only one high-resolution raw image to generate the low-resolution depth image. This may reduce the amount of data to be processed by the method 100 to generate 130 the low-resolution depth image and may thus accelerate the generation of the low-resolution depth image and also the generation of the high-resolution depth image. Of course, further embodiments may also use more raw images to provide a depth image. According to some examples four or eight raw images are used.

Generating the low-resolution depth image based on the (at least first) low-resolution raw image and on the (at least one) high-resolution raw image may comprise adapting the resolution of the high-resolution raw image to the resolution of the (first) low-resolution raw image. For example, the resolution of the high-resolution raw image may be adapted by analog and/or digital pixel-binning to the resolution of the (first) low-resolution raw image. Adapting the resolution of the high-resolution raw image to the resolution of the low-resolution raw image may make the generation of the low-resolution depth image more efficient. For example, after adapting the resolution of the high-resolution raw image, each raw pixel of the resolution adapted high-resolution raw image may correspond (e.g., comprise the same x- and y-coordinates) to a raw pixel of the low-resolution image (or low-resolution images). This may facilitate combining the low-resolution raw image(s) with the high-resolution raw image to calculate depth information for the low-resolution depth image. Adapting the resolution of the high-resolution raw image to the resolution of the low-resolution raw image may increase a signal-to-noise ratio of the raw pixel values in the resolution adapted high-resolution raw image. This may lead to more accurate depth information contained by the depth pixels of the generated low-resolution depth image.

When providing a plurality of low-resolution raw images and/or a plurality of high-resolution raw images for generating 130 the low-resolution depth image, the resolutions of the low-resolution raw images and/or of the high-resolution raw images may be adapted to a common resolution. This common resolution may be the lowest resolution of the provided low-resolution raw images or may be a lower resolution. Moreover, the common resolution may also be higher than the lowest resolution of the low-resolution raw images and/or may be as high as the highest resolution of the low-resolution raw images. For example, the resolution of a low-resolution raw image may be adapted to a higher common resolution using an up-scaling algorithm. If a plurality of low-resolution raw images is provided, the resolution of the at least one high-resolution raw image (or of any high-resolution raw image from a plurality of high-resolution raw images) is higher than the highest resolution of the low-resolution raw images. Among high-resolution raw images of a plurality of high-resolution raw images, the resolution may be the same or may be different. The resolution of any high-resolution raw image may, for example, be at least twice as high (or at least four times as high, or at least nine times as high, or at least sixteen times as high) as the resolution of any low-resolution raw image, for example.

The method 100 may be performed directly at a depth sensing systems or outside a depth sensing system using raw data, for example. For example, the at least first low-resolution raw image and the at least one high-resolution raw image may have been generated (e.g., captured) by a depth sensing system. The at least first low-resolution raw image and the at least one high-resolution raw image may then be directly processed by the method 100 and/or may be stored in a memory (e.g., random-access-memory (RAM) and/or in a non-volatile memory) to be processed by the method 100 at a later point in time at the depth sensing system or at an apparatus configured for generating a high-resolution depth image that may be independent of the depth sensing system (e.g., located outside the depth sensing system).

For example, the at least first low-resolution raw image may be captured by a first time-of-flight sensor and the at least one high-resolution raw image may be captured by a second time-of-flight sensor. The second time-of-flight sensor may comprise more light sensitive elements (e.g., a higher number of light sensitive elements corresponding to the number of raw pixels of the high-resolution raw image) than the first time-of-flight sensor. The first time-of-flight sensor may require less light sensitive elements to capture the at least first low-resolution raw image.

Capturing the at least first low-resolution raw image and capturing the at least one high-resolution raw image may be performed simultaneously by the first and the second time-of-flight sensors, which may reduce motion artifacts in the high-resolution depth image to be generated. Alternatively, the at least first low-resolution raw image and the at least one high-resolution raw image may be captured one after the other and may thus be provided one after the other.

In some embodiments, providing the first low-resolution raw image comprises using a time-of-flight sensor and providing the high-resolution raw image comprises using the same time-of-flight sensor. The high-resolution raw image may be provided after providing at least the first low-resolution raw image. This may reduce motion artifacts in the high-resolution depth image, because a transfer time of a low-resolution raw image from the time-of-flight sensor to an image processing module (and/or to a memory device) may be shorter than a transfer time of a high-resolution raw image. For example, for transferring a low-resolution raw image light sensitive elements of the time-of-flight sensor may be subjected to pixel-binning and/or less light sensitive elements may be read out for the low-resolution raw image than for the high-resolution raw image, for example. Hence, a delay between capturing the at least first low-resolution raw image and the at least one high-resolution raw image may be shorter when providing the at least first low-resolution raw image before providing the at least one high-resolution raw image. Using the same time-of-flight sensor for providing the at least first low-resolution raw image and the at least one high-resolution raw image may decrease the hardware complexity of a depth sensing system, for example.

Additionally, the method 100 may comprise emitting a series of light pulses. Providing 110 the first low-resolution raw image may then comprise receiving a reflection of the series of light pulses during a first active time interval of the time-of-flight sensor. Furthermore, providing 120 the high-resolution raw image may comprise receiving a reflection of the series of light pulses during a second active time interval of the time-of-flight sensor. A first time shift of the first active time interval relative to the start of a light pulse within the emitted series of light pulses may be different to a second time shift of the second active time interval relative to the start of a further light pulse of the emitted series of light pulses.

The first active time interval and the second active time interval may have essentially the same length (e.g., differing by less than 1% of the length of the first active time interval), for example. The first time shift and the second time shift may be known a priori and may be system parameters of the depth sensing system, for example.

For example, a time-of-flight sensor may comprise light sensitive elements with each light sensitive element comprising a first and a second charge repository. A time shift of an active time interval of the time-of-flight sensor relative to the start of an emitted light pulse may then be understood in the following way: Upon receiving a reflection of the series of light pulses at a light sensitive element, electric charge may be generated within the light sensitive element. The light sensitive element may alternate between accumulating the generated electric charge in the first and in the second charge repository. The time shift may then be a time difference between the moment of switching from the first charge repository to the second charge repository (or vice versa) and the start of an emitted light pulse. For providing 110 the first low-resolution raw image, the light sensitive element may switch between the first and the second charge repository at each start of an emitted light pulse and at each start of a pause interval between two emitted adjacent light pulses. In this case, the first time shift of the first active time interval relative to the start of a light pulse within the emitted series of light pulses may be zero. For providing 120 the at least one high-resolution raw image, the moment of switching between the two charge repositories may be in the middle of each emitted light pulse and in the middle of each pause interval. The second time shift of the second active time interval relative to the start of a light pulse in the emitted series of light pulses may hence amount to a half a length of an emitted light pulse. As a result, the first time shift of the first active time interval may be different to the second time shift of the second active time interval.

For another type of time-of-flight sensor with light sensitive elements each comprising only one charge repository, a time shift between an active time interval of the time-of-flight sensor relative to the start of a light pulse within the emitted series of light pulses may be a time difference between the start of the light pulse and the start of a time interval during which electric charge may be accumulated in the charge repository.

Based on the raw pixel values of corresponding raw pixels of the at least first low-resolution raw image and the at least one high-resolution raw image and based on the first time shift and the second time shift, depth information (e.g., a depth value) for each depth pixel of the low-resolution depth image may be calculated.

Corresponding raw pixels of the at least first low-resolution raw image and of the at least one high-resolution raw image may be raw pixels comprising the same (or similar) x-coordinate and the same (or similar) y-coordinate. Because of the higher number of pixels in the at least one high-resolution raw image, several raw pixels (e.g., a group of adjacent raw pixels) in the high-resolution raw image may correspond to a raw pixel in the at least first low-resolution raw image. Alternatively, if the resolution of the at least one high-resolution raw image is optionally adapted to the resolution of the at least first low-resolution raw image, there may be a unique correspondence of each raw pixel of the at least first low-resolution raw image to a raw pixel of the resolution adapted high-resolution raw image.

Additionally, the method 100 may comprise providing a second low-resolution raw image using the (same) time-of-flight sensor after providing the first low-resolution raw image and before providing the high-resolution raw image. A resolution of the second low-resolution raw image may be lower than the resolution of the high-resolution raw image. The resolution of the second low-resolution raw image may be equal to the resolution of the first low-resolution raw image or may differ from the resolution of the first low-resolution raw image. By providing a second low-resolution raw image (or optionally also more additional low-resolution raw images) higher depth accuracy in terms of an improved signal-to-noise ratio and/or in terms of reduced depth ambiguities of depth information contained in the high-resolution depth image may be achieved.

Providing the high-resolution raw image (and/or additional high-resolution raw images) after providing the first and the second low-resolution raw image (and after providing optional additional low-resolution raw images) may reduce and/or minimize the delay between capturing the first low-resolution raw image and the second low-resolution raw image and the delay between capturing the second low-resolution raw image and the at least one high-resolution raw image. For example, the transfer time of data from the time-of-flight sensor to an image processing module (and/or to a memory device) may be shorter for the first and the second (and optionally additional) low-resolution raw images than for the at least one high-resolution raw image.

Similarly to providing the first low-resolution raw image and the at least one high-resolution raw image, a series of light pulses may be emitted for providing additional low-resolution raw images (e.g., the second low-resolution raw image) and a reflection of the emitted series of light pulses may be received during an active time interval of the time-of-flight sensor. Time shifts between the active time intervals of the time-of-flight sensor and the starts of light pulses within the emitted series of light pulses may be different for each provided raw image. This may further improve depth accuracy of the depth pixels of the high-resolution depth image.

A time shift between an active time interval of the time-of-flight sensor (e.g., of a charge repository of a light sensitive element of the time-of-flight sensor) and the start of a light pulse within an emitted series of light pulses may be regarded as a relative phase shift. For example, the time shift between the start of the active time interval of the time-of-flight sensor and the start of an emitted light pulse divided by the length of the emitted light pulse and multiplied by 360° may yield the relative phase shift.

For example, if the start of the active time interval essentially coincides with the start of an emitted light pulse, the relative phase shift may be zero degree.

For example, if the active time interval starts after a quarter of the length of the emitted light pulse has passed, the relative phase shift may be 90°. If the active time interval starts, for example, after half of the length of the emitted light pulse has passed, the relative phase shift may be 180° and so on.

The raw images (e.g., one or more low-resolution raw images and one or more high-resolution raw images) may comprise relative phase shifts equally distributed over 360°. If, for example, only the first low-resolution raw image and only one high-resolution raw image are provided, the first low-resolution raw image may comprise a relative phase shift of zero degree and the high-resolution raw image may comprise a relative phase shift of 180°. For example, if a first and a second low-resolution raw image and one high-resolution raw image are provided, the first low-resolution raw image may comprise a relative phase shift of zero degrees, the second low-resolution raw image may comprise a relative phase shift of 120°, and the high-resolution raw image may comprise a relative phase shift of 240°. In case of three low-resolution raw images and one high-resolution raw image the relative phase shifts related to the provided raw images may differ by 90°. An equal distribution of the relative phase shifts related to the provided raw images may further improve depth accuracy of the high-resolution depth image.

Providing raw images (e.g., the at least first low-resolution raw image and/or the at least one high-resolution raw image) may comprise pixel-binning. Pixel-binning may comprise adapting (e.g., reducing) a resolution of a raw image (and/or of a depth image). Pixel-binning may be performed in the analog domain (e.g., during capturing a raw image at the time-of-flight sensor) or in the digital domain (e.g., by digitally processing a raw image and/or a depth image).

In analog pixel-binning, adjacent light sensitive elements of the time-of-flight sensor may be grouped, such that the time-of-flight sensor may comprise a plurality of groups of light sensitive elements. Upon receiving a reflection of a light pulse, charge may build up in each light sensitive element. For analog pixel-binning, the charges accumulated by the light sensitive elements of a group of light sensitive elements may be averaged (e.g., added) to a common charge (for example by conducting the charges of the light sensitive elements of each group to at least one common charge repository dedicated to this group). The averaged common charge may then be indicative for a raw pixel value of a raw pixel of a raw image that has undergone analog pixel-binning. The number of raw pixels of the raw image that has undergone analog pixel-binning may be equal to the number of groups of light sensitive elements of the time-of-flight sensor.

In digital pixel-binning, adjacent raw pixels of a raw image may be grouped, such that the raw image may comprise a plurality of groups of raw pixels. The raw pixel values of a group of raw pixels may be averaged. The averaged raw pixel value of a group of raw pixels may then correspond to a raw pixel value of a raw pixel of a digitally binned raw image. Digital pixel-binning may also be applied to depth images by grouping depth pixels and averaging depth values.

A pixel-binning process may be described by a binning factor and/or a binning center. The binning factor may be equal to the number of light sensitive elements within a group of light sensitive elements when analog pixel-binning is employed or may be equal to the number of raw pixels (or depth pixels) within a group of raw pixels (or depth pixels) when digital pixel-binning is employed.

For analog pixel-binning, the binning center may correspond to geometrical center of a group of light sensitive elements. For digital pixel-binning, the binning center may correspond to a geometrical center of a group of raw pixels (or depth pixels).

Providing at least the first low-resolution raw image may comprise pixel-binning according to a low-resolution binning factor. Providing the at least one high-resolution raw image may comprise pixel-binning according to a high-resolution binning factor. The low-resolution binning factor may be larger than the high-resolution binning factor.

Pixel-binning for providing the at least first low-resolution raw image and the at least one high-resolution raw image may comprise analog pixel-binning and/or digital pixel-binning. By analog and/or digital pixel-binning the signal-to-noise ratio of the raw pixels the pixel-binned low-resolution raw image and/or the high-resolution raw image may be increased. Setting the binning factor (e.g., the low-resolution binning factor) for pixel-binning the at least first low-resolution raw image larger than the binning factor (e.g., the high-resolution binning factor) for pixel-binning the at least one high-resolution raw image may cause the resolution of the at least first low-resolution raw image to be lower than the resolution of the at least one high-resolution raw image. The low-resolution binning factor may be at least twice as high (or at least four times as high, or at least nine times as high, or at least sixteen times as high) as the high-resolution binning factor. The high-resolution binning factor may be equal to one.

According to an example, providing at least the first low-resolution raw image may comprise analog pixel-binning. Analog pixel-binning may reduce the transfer time of the at least first low-resolution raw image from the time-of-flight sensor to an image processing module (and/or to a memory device).

For example, different binning centers may be employed for providing the first low-resolution raw image than for providing the second low-resolution raw image. This may further improve the depth accuracy of depth pixels of the low-resolution depth image and of the high-resolution depth image. If more than two pixel-binned low-resolution raw images are provided, different binning-centers may be employed for providing each low-resolution raw image. Alternatively, the same binning-centers may be employed for providing some low-resolution raw images, whereas for providing other low-resolution raw images different binning centers may be employed.

Generating 140 the high-resolution depth image is based on the low-resolution depth image and on the at least one high-resolution raw image (but may also be based on additional high-resolution raw images). For example, generating 140 the high-resolution depth image may comprise using an image-guided upscaling algorithm to derive depth values of depth pixels of the high-resolution depth image. The high-resolution raw image may be employed during the image-guided upscaling algorithm and may serve as guidance for deriving depth values of depth pixels of the high-resolution depth image.

For example, depth values of depth pixels of the low-resolution depth image may be mapped to depth pixels of the high-resolution depth image to obtain at least some depth pixels (e.g., mapped depth pixels) of the high-resolution depth image. Other depth pixels (e.g., derived depth pixels) of the high-resolution depth image may be derived based on depth values of depth pixels of the low-resolution depth image and based on raw pixel values of raw pixels of the at least one high-resolution raw image. For example, depth pixels of the high-resolution depth image may be derived based on an interpolation of depth values of depth pixels of the low-resolution depth image. Interpolation constraints and/or interpolation weights may be based on raw pixel values of raw pixels of the at least one high-resolution raw image.

For example, generating 140 the high-resolution depth image may comprise extracting edge information from the (at least one) high-resolution raw image. For example, the raw pixel values of the raw pixels of the high-resolution raw image may be analyzed to extract (e.g., to detect) edges in the high-resolution raw image. For example, discontinuities (e.g., differences between raw pixel values of adjacent raw pixels, for example, differences larger than 10%) may be indicative for an edge (or edges) in the high-resolution raw image. Depth pixels of the low-resolution depth image located on the same side of an edge as a depth pixel to be derived for the high-resolution depth image may influence the depth pixel of the high-resolution depth image to a greater extent than depths pixels of the low-resolution depth image located on the other side of the edge during an interpolation.

Edge information may be extracted from the at least one high-resolution raw image by an edge filtering operation. For example, edge information may be extracted by a Sobel operation and/or a Prewitt operation applied to the at least one high-resolution raw image.

Figure 1B:
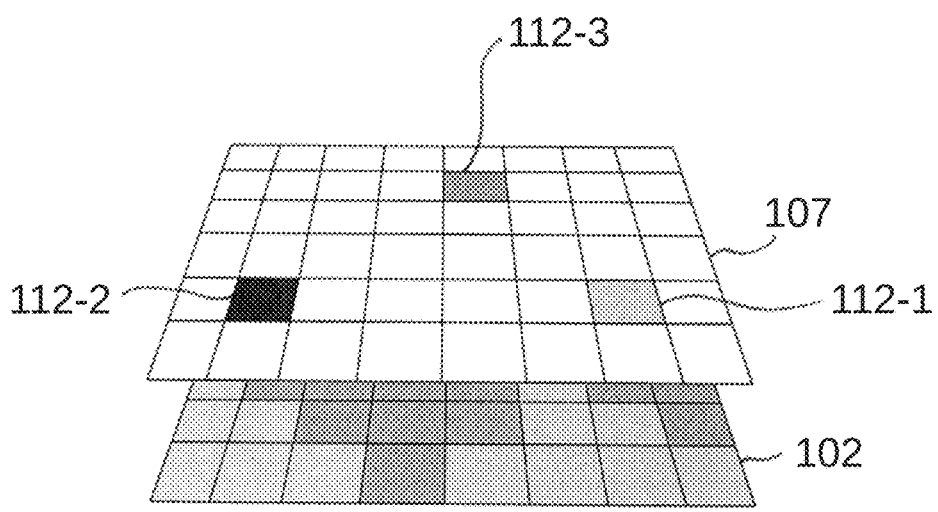
FIG. 1B shows a schematic illustration of at least a part of a high-resolution depth image and a high-resolution raw image.

FIG. 1B shows a schematic illustration of at least part of a high-resolution depth image 107 and a high-resolution raw image 102. As illustrated in FIG. 1B, the high-resolution depth image 107 may have the same image space as the high-resolution raw image 102, meaning that the high-resolution depth image 107 may have the same resolution as the high-resolution raw image 102 and may have the same number of pixels in x-direction and in y-direction (e.g., the width of the high-resolution depth image 107 is equal to the width of the high-resolution raw image 102 and the height of the high-resolution depth image 107 is equal to the height of the high-resolution raw image 102).

At an initial stage of generating 140 the high-resolution depth image 107, the high-resolution depth image 107 may comprise an array of depth pixels that do not yet contain depth values. Depth values may then be provided to the depth pixels of the high-resolution depth image 107 in course of further generating 140 the high-resolution depth image 107. Depth values may be provided in two different ways to the depth pixels of the high-resolution depth image 107. In a first way, depth information may be mapped from the low-resolution depth image to the high-resolution depth image 107. For example, a depth value of a depth pixel of the low-resolution depth image may be mapped to a depth pixel of the high-resolution depth image 107. Such kind of depth pixels of the high-resolution depth image 17 may be referred to as mapped depth pixels. In a second way, depth values may be derived for depth pixels of the high-resolution depth image 107 based on depth information of the low-resolution depth image and based on edge information of the high-resolution raw image 102. Such kind of depth pixels of the high-resolution depth image 107 may be referred to as derived depth pixels. Moreover, depth pixels of the low-resolution depth image may be referred to as measured depth pixels as they may be based on depth measurements (e.g., on the at least first low-resolution raw image and the at least one high-resolution raw image 102).

Generating 140 the high-resolution depth image 107 may comprise generating at least a first (e.g., at least one) mapped depth pixel and at least a first (e.g., at least one) derived depth pixel. The first mapped depth pixel may be based on the low-resolution depth image. The first derived depth pixel may be based on the low-resolution depth image and the high-resolution raw image. In the example of FIG. 1B, the high-resolution depth image 107 comprises three mapped depth pixels, a first mapped depth pixel 112-1, a second mapped depth pixel 112-2, and a third mapped depth pixel 112-3.

For example, a mapped depth pixel (e.g., the first mapped depth pixel 112-1) of the high-resolution depth image 107 may correspond to a measured depth pixel (e.g., a first measured depth pixel) of the low-resolution depth image. For example, the depth value of the first mapped depth pixel 112-1 may be equal to the depth value of the first measured depth pixel. A pixel position (e.g., an x-coordinate and a y-coordinate) of the first mapped depth pixel 112-1 in the high-resolution depth image 107 may correspond (e.g., be proportional) to a pixel position of the first measured depth pixel in the low-resolution depth image. In other words, FIG. 1B may show a schematic illustration of at least a part of the low-resolution depth image scaled to the image space of the high-resolution raw image.

Figure 1C:
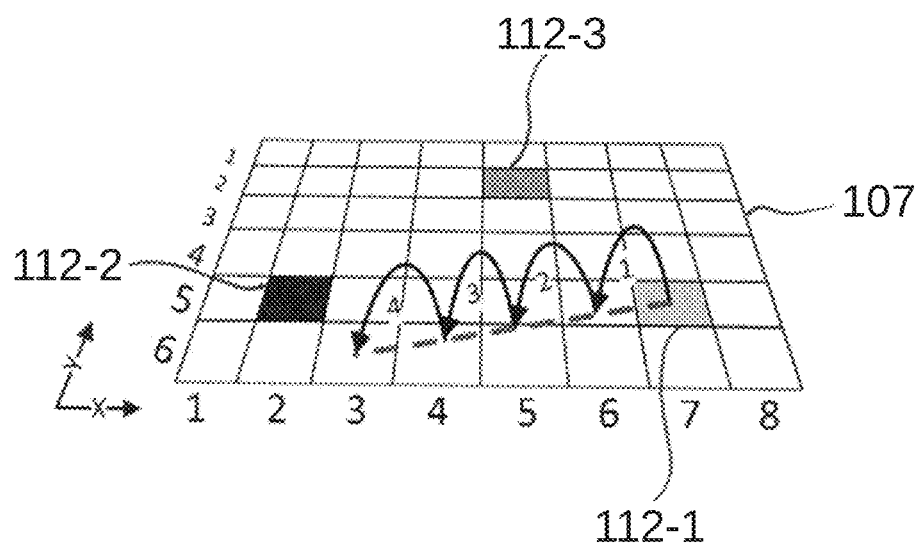
FIG. 1C shows a schematic illustration of at least a part of a high-resolution depth image.

After at least the first mapped depth pixel (or optionally additional mapped depth pixels) has been generated in the high-resolution depth image 107, generating 140 the high-resolution depth image 107 may continue by generating at least the first derived depth pixel (or optionally additional derived depth pixels). This is explained with the aid of FIG. 1C, which shows a schematic illustration of at least a part of the high-resolution depth image 107 and a schematic illustration of generating a derived depth pixel (3|6) (e.g., the depth pixel located at X=3 and Y=6).

As shown in FIG. 10, the mapped depth pixels 112-1, 112-2, and 112-3 may be depth pixel (7|5), depth pixel (2|5) and depth pixel (5|2), respectively, which may each correspond to a different measured depth pixel of the low-resolution depth image. In other words, FIG. 1C may show a schematic illustration of at least a part of the low-resolution depth image scaled to the image space of the high-resolution raw image, for which a derived depth pixel (or a plurality of derived depth pixels) is being generated.

For example, the first derived depth pixel of the high-resolution depth image 107 may at least be based on the first mapped depth pixel 112-1 of the high-resolution depth image 107 and a weighting factor associated with the first mapped depth pixel 112-1 of the high-resolution depth image 107.

For example, generating the first derived depth pixel (e.g., the depth pixel (3|6)) may comprise calculating a first derived depth value $d_{deriv,1}$ of the first derived depth pixel (e.g., the depth pixel (3|6)) based on a first mapped depth value $d_{map,1}$ of the first mapped depth pixel (e.g., the depth pixel (7|5)) and based on a weighting factor w associated with the first mapped depth pixel. For example, the first derived depth value $d_{deriv,1}$ may correspond to a product (e.g., a multiplication) of the first mapped depth value $d_{map,1}$ with the weighting factor w according to:

$$d_{deriv,1} = w \cdot d_{map,1}$$

Figure 1D:
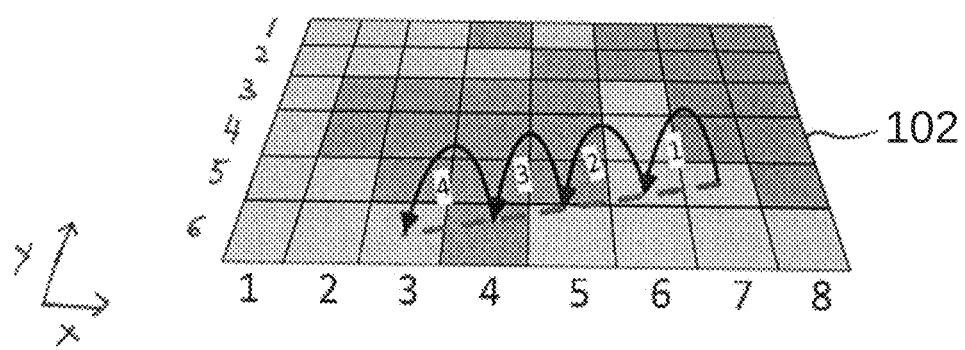
FIG. 1D shows a schematic illustration of at least a part of a high-resolution raw image.

FIG. 1D shows a schematic illustration of at least a part of the high-resolution raw image 102. The high-resolution raw image 102 may be an array of raw pixels. Each raw pixel may correspond to one (or a group) of light sensitive elements of a time-of-flight sensor. Each raw pixel may comprise a raw pixel value. The raw pixel value may be represented by a numerical value (e.g., a floating point number). The high-resolution raw image 102 may comprise at least one reference raw pixel and a first (e.g., at least one) raw pixel different from the reference raw pixel.

The reference raw pixel of the high-resolution raw image 102 may have a pixel position in the high-resolution raw image 102 corresponding to a pixel position of the first mapped depth pixel 112-1 in the high-resolution depth image 107. The first raw pixel of the high-resolution raw image 102 may have a pixel position in the high-resolution raw image 102 corresponding to a pixel position of the first derived depth pixel of the high-resolution depth image 107. The weighting factor w associated with the first mapped depth pixel of the high-resolution depth image 107 may be based on an edge magnitude summation value, $S_E$, of a pixel path between the first raw pixel of the high-resolution raw image and the reference raw pixel of the high-resolution raw image.

In the example of FIG. 1D, the reference raw pixel has a pixel position of (7|5) and the first raw pixel has a pixel position of (3|6). The dotted line in FIG. 1D may mark the pixel path between the reference raw pixel (e.g. raw pixel (7|5)) and the first raw pixel (e.g. raw pixel (3|6)). The edge magnitude summation value $S_E$ may be evaluated for this pixel path by adding edge magnitude values of raw pixels that lie on the pixel path.

The method 100 may additionally comprise determining at least a first (e.g., at least one) edge magnitude value of the pixel path between the first raw pixel of the high-resolution raw image 102 and the reference raw pixel of the high-resolution raw image 102 by an edge filtering operation of the high-resolution raw image 102. The edge magnitude summation value may be based on at least the first edge magnitude value. The method 100 may comprise determining a plurality of edge magnitude values of the pixel path (e.g., of raw pixels that lie on the pixel path) between the first raw pixel and the reference raw pixel by an edge filtering operation. The edge magnitude summation value may be based on the plurality of edge magnitude values and may be the sum of the edge magnitude values. For example, a plurality of edge magnitude values may be determined, if the pixel path between the first raw pixel and the reference raw pixel traverses a plurality of raw pixels (or raw pixel edges). The number of determined edge magnitude values contributing to the edge magnitude summation value may correspond the number of raw pixels of the pixel path or may correspond to (e.g., be equal to) the number of raw pixel edges crossed on the pixel path (e.g., the number of steps of the pixel path). In the example of FIG. 1D the pixel path comprises four steps and crosses four raw pixel edges.

An (or each) edge magnitude value of a (or each) raw pixel of the plurality of raw pixels of the high-resolution raw image 102 may be derived based on raw pixel values from (only) directly neighboring raw pixels of the raw pixel and on the raw pixel value of the raw pixel. The edge filtering operation (e.g., a Sobel operation or similar edge filter operations) may determine an edge magnitude value of each raw pixel based on the raw pixel value of the raw pixel itself and on the raw pixel value (or e.g. raw pixel values) of raw pixels directly surrounding the raw pixel. For example, the edge filtering operation may determine an edge magnitude value of the reference raw pixel (e.g., raw pixel (7|5)) based on the raw pixel value of the reference raw pixel and based on the raw pixel value (or e.g. raw pixel values) of raw pixels directly surrounding the reference raw pixel (e.g. raw pixel (7|4), raw pixel (7|6), raw pixel (6|5), and raw pixel (8|5)).

For every raw pixel on the pixel path, an edge magnitude value may be determined and may be added to the edge magnitude summation value $S_E$. For example, in step 1 (e.g., the step from the reference raw pixel (7|5) to raw pixel (6|5)) and in step 2 (e.g., the step from raw pixel (6|5) to raw pixel (5|6)) no raw pixel value edges are crossed. For example, in step 1 and in step 2 the raw pixel values of the traversed raw pixels do not change as displayed by the same gray shades of the raw pixels (7|5), (6|5), and (5|6). Hence, the edge magnitude summation value $S_E$ may remain constant during step 1 and step 2. In step 3 (e.g., the step from raw pixel (5|6) to raw pixel (4|6)) and in step 4 (e.g., the step from raw pixel (4|6) to the first raw pixel (3|6)) raw pixel value edges are crossed, for example, as indicated by the changing grey shades in step 3 and in step 4. Thus, during step 3 and step 4 the edge magnitude summation value $S_E$ may increase. Due to the increase of the edge magnitude summation value $S_E$ the weighting factor w may decrease, such that the influence of the depth value of the mapped depth pixel 112-1 (e.g. depth pixel (7|5) in the high-resolution depth image 107) on the depth value of the first derived (or to be derived) depth pixel (3|6) in the high-resolution depth image 107 may decrease.

For example, the weighting factor w may decrease exponentially with an increasing edge magnitude summation value $S_E$ between the first raw pixel (e.g. raw pixel (3|6)) and the reference raw pixel (e.g. raw pixel (7|5)).

A function or formula to convert the edge magnitude summation value $S_E$ to the weighting factor w may be one that allows small changes of $S_E$ to lead to large changes of w. Additionally, depth values may need to be restricted from propagating over edges if there are valid depth measurements on the other side of the edge. For example, depth values may be restricted from propagating across edges, because of the decreasing weighting factor.

A natural exponential function (exp) may suit this purpose well. For example, generating 140 the high-resolution depth image 107 may comprise calculating the weighting factor w based on the edge magnitude summation value $S_E$ according to the relationship:

$$w = \exp\left(-\frac{S_E}{\sigma}\right).$$

w may represent the weighting factor.

$S_E$ may represent the edge magnitude summation value based on a sum of edge magnitude values between the first raw pixel and the reference raw pixel.

σ may represent a scalar parameter. The parameter σ may scale the argument of the exponential function, in order to restrict the range of the weighting factor w to the boundaries of a floating point data type (e.g. a 32 bit floating point data type), for example. For example, the smaller the scalar parameter, the steeper the exponential function and the larger the influence decay. Thus, a smaller scalar parameter may lead to a sharper upscaled depth image. For example, the parameter σ may be less than 0.6 (or e.g. less than 0.05, or e.g. less than 0.01). For example, the method 100 may comprise selecting the value of the scalar parameter. Optionally, the parameter σ may be selected to be as small as possible.

Optionally, the weighting factor w may be based solely (or only) on the edge magnitude summation value $S_E$ and the scalar parameter, for example. In other words, the edge magnitude summation value $S_E$ may be the only variable parameter influencing the weighting factor w for example.

Additionally or optionally, the spatial distance from each depth pixel to be derived (e.g. the first derived depth pixel (3|6)) to the mapped depth pixel (e.g. the mapped depth pixel (7|5)) might not have any influence on the weighting factor w. For example, the edge magnitude summation value and/or the weighting factor may be independent from the spatial distance between each pixel to be derived (e.g. the first derived depth pixel (3|6)) and the mapped depth pixel (e.g., the mapped depth pixel (7|5)). The weighting factor may decrease with the sum of the magnitudes of the raw pixel value edges in the high-resolution raw image 102. For example, minor edges do not contribute as much as stronger edges.

Optionally, generating the first derived depth pixel (e.g., the depth pixel (3|6)) may comprise calculating the first derived depth value $d_{deriv,1}$ of the first derived depth pixel (e.g., the depth pixel (3|6)) based on more than one mapped depth pixel (or e.g. a plurality of mapped depth pixels) influencing the first derived depth value $d_{deriv,1}$ of the first derived depth pixel.

For example, the first derived depth pixel (e.g. depth pixel (3|6)) may lie within a first pixel influence radius of the first mapped depth pixel 112-1 (e.g. depth pixel (7|5)) and within a second pixel influence radius of the second mapped depth pixel 112-2 (e.g. depth pixel (2|5)). Thus, generating the first derived depth pixel may comprise calculating (or deriving) the first derived depth value $d_{deriv,1}$ based on a weighting factor (e.g., a first weighting factor $w_1$) associated with the first mapped depth value $d_{map,1}$ of the first mapped depth pixel 112-1 and a weighting factor (e.g., a second weighting factor $w_2$) associated with a second mapped depth value $d_{map,2}$ of the second mapped depth pixel 112-2.

For example, generating the first derived depth pixel may comprise deriving each weighting factor $w_n$ associated with each mapped depth pixel n in whose pixel influence radius the first derived depth pixel (e.g. depth pixel (3|6)) lies. A pixel influence radius may comprise a fixed pixel distance that may depend on a number and/or on a distribution of mapped depth pixels in the high-resolution depth image 107. The pixel distance may be equal to or larger than 1 depth pixel, or larger than 5 depth pixels, or larger than 10 depth pixels, or larger than 100 depth pixels, for example.

Generating the first derived depth pixel (or a derived depth pixel) of the high-resolution depth image 107 may comprise calculating the (first) derived depth value $d_{deriv,1}$ of the first derived depth pixel (or a derived depth value $d_{deriv,i}$ of a derived depth pixel i) based on a sum of weighting factors $\Sigma_{n=1}^{k} w_n$ and a sum of weighted depth values $\Sigma_{n=1}^{k} d_{map,n} \cdot w_n$ associated with the at least one mapped depth pixel (e.g., the first mapped depth pixel or e.g. a plurality of mapped depth pixels) influencing the (first) derived depth pixel. Each weighted depth value of the sum of weighted depth values may be based on a product (e.g. a multiplication) of a mapped depth value $d_{map,n}$ and a weighting factor $w_n$ associated with the mapped depth pixel.

For example, generating the high-resolution depth image 107 may comprise calculating each derived depth value $d_{deriv,i}$ of each derived depth pixel of the high-resolution depth image 107 based on the relationship (or e.g. the interpolation formula):

$$d_{deriv,i} = \frac{\sum_{n=1}^{k} d_{map,n} \cdot w_n}{\sum_{n=1}^{k} w_n}.$$

$d_{deriv,i}$ may represent the derived depth value of the derived depth pixel i of the high-resolution depth image 107, for example.

k may represent the number of mapped depth pixels influencing the derived depth pixel, for example.

$d_{map,n}$ may represent the mapped depth value of a mapped depth pixel n influencing the derived depth value, for example.

$w_n$ may represent the weighting factor associated with the mapped depth pixel n, for example.

Each weighting factor $w_n$ may be derived based on a corresponding edge magnitude summation value, $S_{E,n}$. For example, generating a derived depth pixel (e.g., the first derived depth pixel) may comprise deriving the weighting factor $w_1$ associated with the first mapped depth value $d_{map,1}$ of the first mapped depth pixel 112-1 (e.g., the depth pixel (7|5)) based on an edge magnitude summation value $S_{E,1}$ of a pixel path between the first raw pixel (e.g. raw pixel (3|6)) and the first reference raw pixel (e.g. raw pixel (7|5)). The first reference raw pixel (e.g. raw pixel (7|5)) may have a pixel position in the high-resolution raw image 102 corresponding to a (first) mapped depth pixel (e.g. depth pixel (7|5)) in the high-resolution depth image 107. Additionally, generating the derived depth pixel (e.g., the first derived depth pixel) may comprise deriving a weighting factor $w_2$ associated with a second mapped depth value $d_{map,2}$ of the second mapped depth pixel 112-2 (e.g., the depth pixel (2|5)) based on an edge magnitude summation value $S_{E,2}$ of a pixel path between the first raw pixel (e.g. raw pixel (3|6)) and a second reference raw pixel (e.g. raw pixel (2|5)). The second reference raw pixel (e.g. raw pixel (2|5)) may have a pixel position in the high-resolution raw image 102 corresponding to the second mapped depth pixel 112-2 (e.g. depth pixel (2|5)) in the high-resolution depth image 107.

Figure 2:
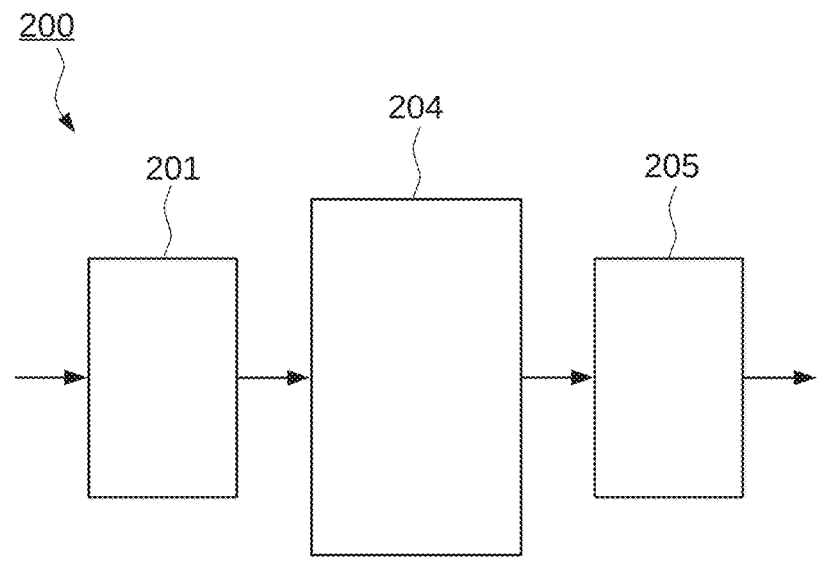
FIG. 2 shows a block diagram of an apparatus for generating a high-resolution depth image.

FIG. 2 shows an apparatus 200 for generating a high-resolution depth image. The apparatus 200 comprises an input interface 201 configured for receiving at least a first low-resolution raw image and for receiving at least one high-resolution raw image. A resolution of the first low-resolution raw image is lower than a resolution of the high-resolution raw image. Furthermore, the apparatus 200 comprises an image processing module 204 configured for generating a low-resolution depth image and configured for generating a high-resolution depth image based on the low-resolution depth image and based on the high-resolution raw image. Furthermore, the apparatus 200 comprises an output interface 205 configured for providing the generated high-resolution depth image.

By generating a high-resolution depth image based on a low-resolution depth image and on a high-resolution raw image, the apparatus 200 may operate on a reduced amount of raw data. This may improve the generated high-resolution depth image in terms of noise, depth accuracy, and/or motion artifacts without sacrificing resolution.

The apparatus 200 may be a computer microcontroller (e.g. a central processing unit CPU), a processor or may be part of a computer, a processor or microcontroller, for example. The apparatus 200 may be part of a camera system (e.g., a mobile device, a telecommunications device, a computer, or a laptop) which may include at least one time-of-flight sensor for capturing a low-resolution raw image and a high-resolution raw image.

Each module of the apparatus 200 (e.g. the image processing module 204) may be (or may be part of, or may include) a computer (e.g. a central processing unit CPU), a processor, a microcontroller, or a circuit, for example.

The image processing module 204 of the apparatus 200 may comprise a first processing unit configured for generating the low-resolution depth image and may comprise a second processing unit configured for generating the high-resolution depth image. The first processing unit may be a different hardware device or a different part of a hardware device than the second processing unit. For example, the first processing unit may be a central processing unit (or a part of a central processing unit) and the second processing device may be a graphics processing unit (GPU).

For example, generating the low-resolution depth image may be carried out on the first processing unit and generating the high-resolution depth image may be carried out on the second processing unit (or vice versa). This may allow a faster generation of the high-resolution depth image and/or may allow a faster generation of a sequence of high-resolution depth images. For example, while a first high-resolution depth image is being generated at the second processing unit based on a first low-resolution depth image and a first high-resolution raw image, a second low-resolution depth image may already be generated on the first processing unit to be provided to the second processing unit together with a second high-resolution raw image for generating another (e.g., a second) high-resolution depth image at the second processing unit. The input interface 201 may be configured to directly provide a high-resolution raw image to both the first processing unit and the second processing unit (and to provide low-resolution raw images at least to the first processing unit).

The input interface 201 may be an input port of a computer, a processor or a microcontroller, for example. The input interface 201 may be coupled to the apparatus 200 via a wired or wireless connection, for example. After having received at least a first low-resolution raw image and at least one high-resolution raw image, the input interface 201 may provide the at least first low-resolution raw image and the at least one high-resolution raw image to the image processing module 204.

The input interface 201 of the apparatus 200 may be configured to receive the low-resolution raw image and the high-resolution raw image from at least one depth sensing device (e.g., a time-of-flight sensor or an ultrasonic sensor) which may be configured to generate (e.g., capture) the low-resolution depth image and the high-resolution raw image. For example, the depth sensing device may be configured to generate both the low-resolution raw image and the high-resolution raw image by employing a lower binning factor for generating the low-resolution raw image than for generating the high-resolution raw image, for example. Alternatively, the input interface 201 may be configured to receive the low-resolution raw image from a low-resolution depth sensing device and may be configured to receive the high-resolution raw image from a high-resolution depth sensing device that is different from the low-resolution depth sensing device, for example.

Additionally or alternatively, the input interface 201 may be configured to receive the at least first low-resolution raw image and the at least one high-resolution raw image from a telecommunication network (e.g., the internet) and/or from a memory device (e.g., a hard disk, a compact disk, and/or a Universal-Serial-Bus memory stick).

The output interface 205 of the apparatus 200 for providing the generated high-resolution depth image may include (or may be) a video port, which may be configured to provide the generated high-resolution depth image to a display device, to a storage device, or to a telecommunication device, for example.

Figure 4:
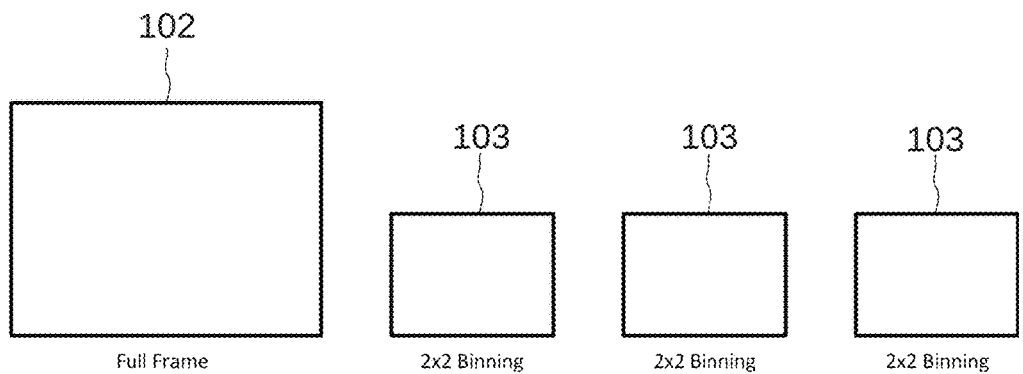
FIG. 4 illustrates an example of a raw image capturing method.
Figure 5:
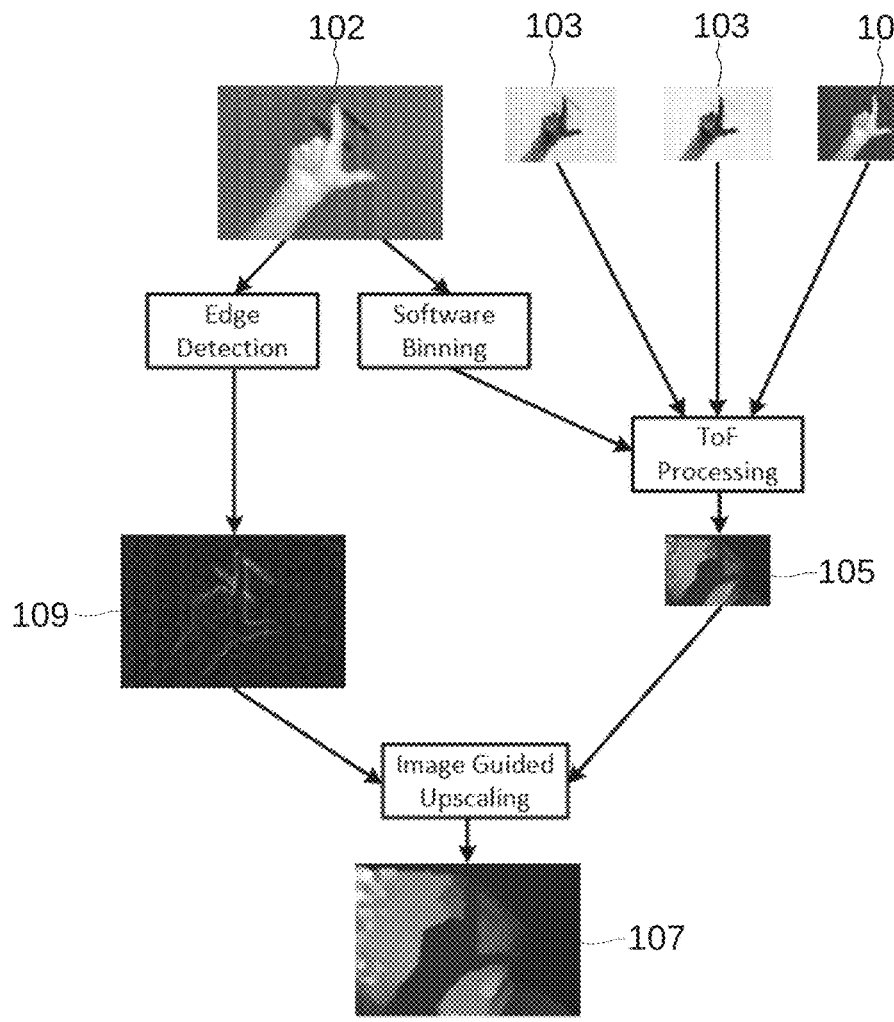
FIG. 5 illustrates a flow chart of a method for generating a high-resolution depth image.

More details and aspects are mentioned in connection with the embodiments described above or below. The embodiment shown in FIG. 2 may comprise one or more optional additional features corresponding to one or more aspects mentioned in connection with the proposed concept or one or more embodiments described above (e.g. FIGS. 1A to 1D) or below (FIGS. 3 to 5).

Figure 3:
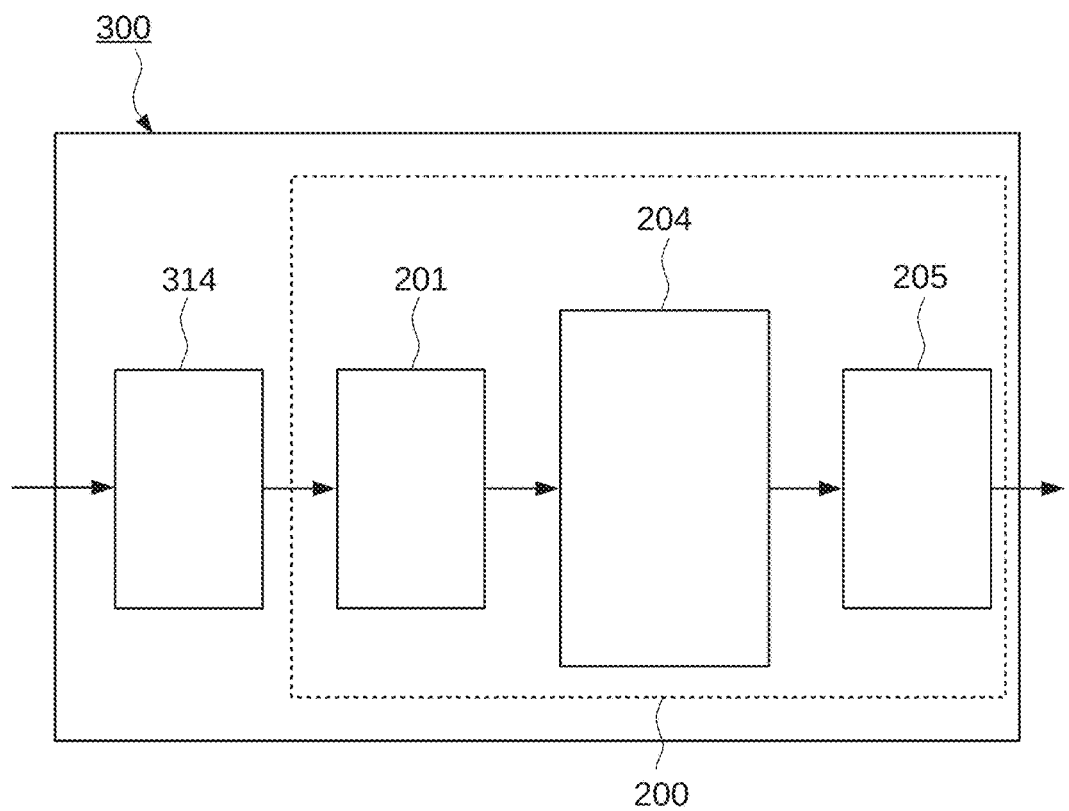
FIG. 3 shows a block diagram of a depth sensing system for generating a high-resolution depth image.

FIG. 3 shows a block diagram of a depth sensing system 300 for generating a high-resolution depth image. The depth sensing system 300 comprises a time-of-flight sensor 314 configured for capturing at least a first low-resolution raw image and configured for capturing at least one high-resolution raw image. A resolution of the first low-resolution raw image is lower than a resolution of the high-resolution raw image. Furthermore, the depth sensing system 300 comprises an apparatus 200 for generating the high-resolution depth image.

By capturing the at least first (e.g., at least one) low-resolution raw image and the at least one high-resolution raw image by one and the same time-of-flight sensor, the hardware complexity of the depth sensing system 300 may be reduced. The depth sensing system 300 may avoid additional sensor devices for generating the high-resolution depth image and may thus comprise reduced power consumption. Due to the depth sensing system comprising the apparatus 200, the depth sensing system 300 may generate a high-resolution depth image based on a reduced amount of raw data. The generated high-resolution depth image may thus be improved in terms of noise, depth accuracy, and/or motion artifacts without sacrificing resolution of the high-resolution depth image, for example.

The apparatus 200 may include one or more or all of the features of the apparatus described in connection with FIG. 2 and may be configured to perform the method 100 (with one or more or all optional or additional features) as described in connection with FIGS. 1A to 1D.

For example, the apparatus 200 of the depth sensing system 300 may comprise an input interface 201 configured for receiving at least a first low-resolution raw image and for receiving at least one high-resolution raw image. A resolution of the first low-resolution raw image is lower than a resolution of the high-resolution raw image. The input interface 201 may receive the at least first low-resolution raw image and the at least one high-resolution raw image from the time-of-flight sensor 313, for example. For example, the time-of-flight sensor 313 is (directly) coupled to the input interface 201.

Furthermore, the apparatus 200 of the depth sensing system 300 may comprise an image processing module 204 configured for generating a low-resolution depth image and configured for generating a high-resolution depth image based on the low-resolution depth image and based on the high-resolution raw image.

The apparatus 200 of the depth sensing system 300 may furthermore comprise an output interface 205 configured for providing the generated high-resolution depth image.

Additionally, the depth sensing system 300 may comprise an illumination module. The illumination module may be configured for emitting a series of light pulses. The time-of-flight sensor may be configured to receive reflections of the series of light pulses during active time intervals of the time-of-flight sensor. A first active time interval for receiving a reflection of the series of light pulses to capture the first low-resolution raw image may comprise a first relative phase shift with respect to the start of a light pulse within the emitted series of light pulses. Furthermore, a second active time interval for receiving a reflection of the series of light pulses to capture the high-resolution raw image may comprise a second relative phase shift with respect to the start of a further light pulse within the emitted series of light pulses. The first relative phase shift may be different from the second relative phase shift.

For example, the first relative phase shift may differ from the second relative phase shift by at least 30° (or by at least 45°, or by at least 90°, or by at least 180°, or by at least 270°) and may differ by less than 360°. Due to the different relative phase shifts for capturing the first low-resolution raw image and for capturing the high-resolution raw image, depth information may be extracted (e.g., calculated) based on the first low-resolution raw image and the high-resolution raw image only. Hence, the first low-resolution raw image together with the high-resolution raw image may be sufficient for generating the low-resolution depth image and thus also for generating the high-resolution depth image. This may avoid capturing additional low-resolution raw images and/or additional high-resolution raw images. This may make the generation of the high-resolution depth image more time efficient and/or may decrease the power consumption of the depth sensing system 300. If optionally additional low-resolution raw images with differing relative phase shifts are captured the high-resolution raw image may comprise a different relative phase shift than any of the low-resolution raw images. The high-resolution raw image may then further enhance the depth accuracy of the generated high-resolution depth image. For example, four low-resolution raw images with relative phase shifts of 0°, 90°, 180°, and 270° could be used to generate the low-resolution depth image. However, a high-resolution raw image with a relative phase shift of 270°, for example, may save on capturing the low-resolution raw image with 270° relative phase shift and/or may substitute the low-resolution raw image with 270° relative phase shift, for example. The generation of the high-resolution depth image may then be based on the generated low-resolution depth image and on the high-resolution raw image with 270° relative phase shift, for example.

An active time interval of the time-of-flight sensor may correspond to an active time interval of a charge repository of a light sensitive element (or of charge repositories of light sensitive elements) of the time-of-flight sensor for accumulating electric charge generated in course of reception of light pulses at the time-of-flight sensor.

More details and aspects are mentioned in connection with the embodiments described above or below. The embodiment shown in FIG. 3 may comprise one or more optional additional features corresponding to one or more aspects mentioned in connection with the proposed concept or one or more embodiments described above (e.g. FIGS. 1A to 2) or below (FIGS. 4 to 5).

FIG. 4 illustrates an example of a raw image capturing method according to an embodiment. One image (e.g., the full frame or the high-resolution raw image 102) is read out with full resolution, the others (e.g., three low-resolution raw images 103) with binning (e.g., pixel-binning). According to an aspect of the present disclosure, a new capturing mode for time-of-flight raw data is proposed. For example, 4 or 8 raw images may be captured to calculate a depth image (e.g., the low-resolution depth image and/or the high-resolution depth image). According to an aspect of the present disclosure, 4 or 8 raw images may be captured, but with different pixel-binning modes (e.g., with different binning factors and/or different binning centers) as illustrated in FIG. 4. For example, one raw image (e.g., the high-resolution raw image 102) may be captured without or less binning (e.g., a smaller binning factor) than the other raw images (e.g., one or more low-resolution raw images 103). By using high-resolution edge information of the first image (e.g., the high-resolution raw image 102), a high-resolution depth image may be reconstructed while using pixel-binning, for example.

More details and aspects are mentioned in connection with the embodiments described above or below. The embodiment shown in FIG. 4 may comprise one or more optional additional features corresponding to one or more aspects mentioned in connection with the proposed concept or one or more embodiments described above (e.g. FIGS. 1A to 3) or below (FIG. 5).

FIG. 5 illustrates a flow chart of a method for generating a high-resolution depth image 107 according to an embodiment. For example, three low-resolution raw images 103 and one high-resolution raw image 102 are provided. The resolution of the high-resolution raw image 102 may be adapted to the resolution of the three low-resolution raw images 103 by software binning (e.g., digital pixel-binning). Generating a low-resolution depth image 105 may then be based on the three low-resolution raw images 103 together with the resolution adapted high-resolution raw image 102. Furthermore, edges (e.g., raw pixel value edges) may be detected in the high-resolution raw image 102. The high-resolution depth image 107 may then be generated based on the detected edges of the high-resolution raw image 102 and based on the low-resolution depth image 105. The resolution of the high-resolution depth image 107 may be equal to the resolution of the high-resolution raw image 102.

For example, after four raw images (e.g., three low-resolution raw images and one high-resolution raw image) or 8 raw images (e.g. 7 low-resolution raw images and one high-resolution raw image) are captured, the high-resolution raw image 102 may be binned by software to fit the other images (e.g., the low-resolution raw images 103). These images (e.g., the resolution adapted high-resolution raw image 102 and the low-resolution raw images 103) may then be used to compute a low-resolution depth image 105. This may be done by a toolchain. From the high-resolution raw image 102, edges may be extracted. An edge image 109 may be constructed from the extracted edges. This edge image 109 (e.g., the edge information extracted from the high-resolution raw image 102) and the low-resolution depth image 105 may be the input for an upscaling algorithm. This algorithm (Image Guided Upscaling) may use the high-resolution edge information (e.g., the edge information extracted from the high-resolution raw image 102), to convert the low-resolution depth image to the high-resolution depth image 107.

For example, FIG. 5 may illustrate a working principle of an embodiment of the present disclosure.

More details and aspects are mentioned in connection with the embodiments described above or below. The embodiment shown in FIG. 5 may comprise one or more optional additional features corresponding to one or more aspects mentioned in connection with the proposed concept or one or more embodiments described above (e.g. FIGS. 1A to 4) or below.

Some examples relate to a capturing mode for time of flight raw images and/or to a combined high and low resolution time-of-flight sensor readout. Other methods may calculate depth images from raw sensor data involving capturing 4 or 8 raw images that all have the same size and resolution. According to an example of the present disclosure, one raw image (e.g., the high-resolution raw image) may be captured at full resolution, while the others (e.g., the low-resolution raw images) may be captured at low resolution, using binning (e.g., pixel-binning). These images (e.g., the low-resolution raw images and/or the high-resolution raw image) may be used to calculate a low-resolution depth image. The high-resolution raw image may act as guidance to reconstruct high-resolution depth data. The final depth image may be high-resolution.

According to another aspect of the present disclosure, a novel data capturing method for time-of-flight cameras is introduced. The camera may capture raw data (e.g., raw images) in a measurement sequence just partially with binning (e.g., pixel-binning). The binned depth data may later be restored. This may accelerate the capturing process, and may make the sensor (e.g., the time-of-flight sensor) more sensitive. It may also produce less data, which may be transferred to the processing system (e.g., an image processing module). In other devices or systems, the resolution of the image (e.g., the depth image to be generated) may be reduced by binning, but with the disclosed method, the high-resolution may be preserved.

Faster data capturing may lead to reduced error through motion artifacts, because the raw images which a depth image is composed of may be captured in a shorter time interval. Faster capturing may also be in employed in applications, where high frame rates are demanded such as gesture recognition.

If pixel-binning is applied, the depth images may be sensed with less error, because the pixels (e.g., raw pixel values of raw pixels and/or depth values of depth pixels) are averaged. This may enhance the range of the sensor and may improve the accuracy of the depth measurements. Optionally, the accuracy gain may be used to further accelerate the capturing process, if the accuracy gain may be traded off against measurement time (e.g., the length of an active time interval of the time-of-flight sensor). In this case, the illumination time may be reduced. This may decrease the power consumption of the device (e.g., the depth sensing system). Time-of-flight cameras may be used in mobile devices. Reduced power consumption in mobile devices may lead to longer recharging cycles.

A part of the capturing process may be the sensor readout. This may take some time, because the pixels (e.g., the light sensitive elements) may be read and the data may be transferred to the processing system (e.g., the apparatus for generating the high-resolution depth image). For example, since four or more raw images may be captured for one depth image, this part may influence the capturing time. According to an aspect of the present disclosure, data rate (e.g., an amount of data) that may be transferred between the sensor and the processing system (e.g., the apparatus for generating the high-resolution depth image) may be reduced. This reduction may cause a speedup for the capturing (e.g., the capturing of the raw images). It may also reduce the effort of the processing system (e.g., the apparatus for generating the high-resolution depth image) to calculate the final depth images (e.g., the high-resolution depth image). When 2×2 binning is employed, the produced sensor data size may be 25% of the original data size during the four raw image operation mode, for example. With an eight raw image method, the data size may be reduced to 18.7%, for example.

According to an aspect of the present disclosure, an image-guided upscaling algorithm may be used to reconstruct high-resolution depth images from low-resolution measurements, for example. The processing costs for this algorithm may be offset (e.g., may be compensated or overcompensated) by the reduced data processing of the original depth image due to the lower resolutions. The usage of an image-guided upscaling algorithm may have the following effects: Processing load may be offloaded (e.g., transferred) to a different computing unit in a system (e.g., a different processor or a GPU). When an algorithm uses a high-resolution image (e.g., the high-resolution raw image) to upscale low-resolution data (e.g., depth information contained in the low-resolution depth image), the edge information of the high-resolution image (e.g., the high-resolution raw image) may also correct errors (e.g., invalid depth pixels). For example, missing information may be interpolated properly and noise may be reduced without sacrificing image quality (e.g., resolution).

According to an aspect of the present disclosure, noise, invalid depth pixels and/or motion artifacts may be reduced in the generated high-resolution depth image and/or power consumption, sensor readout time and/or thermal stress occurring at the depth sensing system may be reduced. The time-of-flight camera of the employed depth sensing system may support pixel-binning, where, e.g., 2×2 or 4×4 pixels (e.g., raw pixels) may be averaged directly at the sensor to increase the signal strength. Furthermore, data size (e.g., data size of the provided raw images), readout time and processing time in the camera module may be reduced. Binning may reduce the resolution of the camera. For instance, 2×2 binning may reduce the number of pixels by a factor of four.

Embodiments may comprise using binning, however, may be able to maintain high resolution. Binning may reduce the amount of raw-data, the sensor produces, may mitigate motion artifacts and may increase the frame rate. Furthermore, it may open the door to use an image-guided processing algorithm, able to mitigate errors such as image noise, without loss of information.

Embodiments may provide improvements in the field of time-of-flight depth sensing. For example, other approaches might not offer these improvements without making sacrifices. For example, other devices may improve one of the following quality characteristics, however tradeoffs may be introduced. For example, other approaches may increase sensitivity. Pixel binning may increase the signal to noise ratio and may thus improve the sensitivity of the camera. However, the depth image resolution may be reduced by a factor of 4 or 16 (for 2×2 or 4×4 binning, respectively). Longer exposure of the sensor may increase the sensitivity, but may decrease eye-safety and/or increase power consumption. To decrease motion artifacts, the related raw images may be captured with lower delay. Binning might reduce the delay due to faster readout, but resolution may be reduced as well.

Example embodiments may further provide a computer program having a program code for performing one of the above methods, when the computer program is executed on a computer or processor. A person of skill in the art would readily recognize that acts of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A method for generating a high-resolution depth image, the method comprising:
   providing at least a first low-resolution raw image;
   providing at least one high-resolution raw image, wherein a resolution of the high-resolution raw image is higher than a resolution of the first low-resolution raw image;
   generating a low-resolution depth image; and
   generating the high-resolution depth image based on the low-resolution depth image and the high-resolution raw image.

2. The method of claim 1, wherein generating the low-resolution depth image is based on the low-resolution raw image and on the high-resolution raw image.

3. The method of claim 2, wherein generating the low-resolution depth image comprises adapting the resolution of the high-resolution raw image to the resolution of the first low-resolution raw image.

4. The method of claim 1, wherein providing at least the first low-resolution raw image comprises pixel-binning according to a low-resolution binning factor, wherein providing the high-resolution raw image comprises pixel-binning according to a high-resolution binning factor, wherein the low-resolution binning factor is larger than the high-resolution binning factor.

5. The method of claim 1, wherein providing at least the first low-resolution raw image comprises analog pixel-binning.

6. The method of claim 1, wherein generating the high-resolution depth image comprises extracting edge information from the high-resolution raw image.

7. The method of claim 1, wherein generating the high-resolution depth image comprises generating at least a first mapped depth pixel and at least a first derived depth pixel, wherein the first mapped depth pixel is based on the low-resolution depth image, and wherein the first derived depth pixel is based on the low-resolution depth image and the high-resolution raw image.

8. The method of claim 7, wherein the first mapped depth pixel of the high-resolution depth image corresponds to a first measured depth pixel of the low-resolution depth image.

9. The method of claim 8, wherein the first derived depth pixel of the high-resolution depth image is at least based on the first mapped depth pixel of the high-resolution depth image and a weighting factor associated with the first mapped depth pixel of the high-resolution depth image.

10. The method of claim 9, wherein a reference raw pixel of the high-resolution raw image has a pixel position in the high-resolution raw image corresponding to a pixel position of the first mapped depth pixel in the high-resolution depth image, wherein a first raw pixel of the high-resolution raw image has a pixel position in the high-resolution raw image corresponding to a pixel position of the first derived depth pixel of the high-resolution depth image, and wherein the weighting factor is based on an edge magnitude summation value of a pixel path between the first raw pixel of the high-resolution raw image and the reference raw pixel of the high-resolution raw image.

11. The method of claim 10, further comprising determining at least a first edge magnitude value of the pixel path between the first raw pixel of the high-resolution raw image and the reference raw pixel of the high-resolution raw image by an edge filtering operation of the high-resolution raw image, wherein the edge magnitude summation value is based on at least the first edge magnitude value.

12. The method of claim 1, wherein providing the first low-resolution raw image comprises using a time-of-flight sensor, wherein providing the high-resolution raw image comprises using the time-of-flight sensor, wherein the high-resolution raw image is provided after providing at least the first low-resolution raw image.

13. The method of claim 12 further comprising emitting a series of light pulses;
   wherein providing the first low-resolution raw image comprises receiving a reflection of the series of light pulses during a first active time interval of the time-of-flight sensor;

wherein providing the high-resolution raw image comprises receiving a reflection of the series of light pulses during a second active time interval of the time-of-flight sensor;

wherein a first time shift of the first active time interval relative to the start of a light pulse within the emitted series of light pulses is different to a second time shift of the second active time interval relative to the start of a further light pulse of the emitted series of light pulses.

14. The method of claim 12, further comprising providing a second low-resolution raw image using the time-of-flight sensor after providing the first low-resolution raw image and before providing the high-resolution raw image, wherein a resolution of the second low-resolution raw image is lower than the resolution of the high-resolution raw image.

15. The method of claim 14, wherein for providing the first low-resolution raw image different binning centers are employed than for providing the second low-resolution raw image.

16. An apparatus for generating a high-resolution depth image, the apparatus comprising:
an input interface configured for receiving at least a first low-resolution raw image and for receiving at least one high-resolution raw image, wherein a resolution of the first low-resolution raw image is lower than a resolution of the high-resolution raw image;
an image processing module configured for generating a low-resolution depth image and configured for generating a high-resolution depth image based on the low-resolution depth image and based on the high-resolution raw image; and
an output interface configured for providing the generated high-resolution depth image.

17. The apparatus of claim 16 for generating the high-resolution depth image, wherein the image processing module comprises a first processing unit configured for generating the low-resolution depth image, and comprises a second processing unit configured for generating the high-resolution depth image.

18. A depth sensing system for generating a high-resolution depth image, the depth sensing system comprising:
a time-of-flight sensor configured for capturing at least a first low-resolution raw image and configured for capturing at least one high-resolution raw image, wherein a resolution of the first low-resolution raw image is lower than a resolution of the high-resolution raw image; and
an apparatus according to claim 16 for generating the high-resolution depth image.

19. The depth sensing system according to claim 18 further comprising an illumination module configured for emitting a series of light pulses;
wherein the time-of-flight sensor is configured to receive reflections of the series of light pulses during active time intervals of the time-of-flight sensor;
wherein a first active time interval for receiving a reflection of the series of light pulses to capture the first low-resolution raw image comprises a first relative phase shift with respect to the start of a light pulse within the emitted series of light pulses;
wherein a second active time interval for receiving a reflection of the series of light pulses to capture the high-resolution raw image comprises a second relative phase shift with respect to the start of a further light pulse within the emitted series of light pulses;
wherein the first relative phase shift is different to the second relative phase shift.

20. A non-transitory machine readable storage medium including program code, when executed, to cause a machine to perform a method comprising:
providing at least a first low-resolution raw image;
providing at least one high-resolution raw image, wherein a resolution of the high-resolution raw image is higher than a resolution of the first low-resolution raw image;
generating a low-resolution depth image; and
generating the high-resolution depth image based on the low-resolution depth image and the high-resolution raw image.

* * * * *